United States Patent
Rivkin et al.

(10) Patent No.: US 9,805,742 B1
(45) Date of Patent: Oct. 31, 2017

(54) SELECTIVE DATA WRITER COIL

(71) Applicant: Seagate Technology LLC, Cupertino, CA (US)

(72) Inventors: Kirill A. Rivkin, Edina, MN (US); JianHua Xue, Maple Grove, MN (US); Wei Tian, Eden Prairie, MN (US); Lei Lu, Bloomington, MN (US); Jian Zhong, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/445,267

(22) Filed: Feb. 28, 2017

(51) Int. Cl.
*G11B 5/09* (2006.01)
*G11B 5/17* (2006.01)
*G11B 5/31* (2006.01)

(52) U.S. Cl.
CPC .............. *G11B 5/09* (2013.01); *G11B 5/17* (2013.01); *G11B 5/3123* (2013.01)

(58) Field of Classification Search
None
See application file for complete search history.

(56) References Cited

U.S. PATENT DOCUMENTS

| | | | |
|---|---|---|---|
| 5,402,200 A * | 3/1995 | Shrinkle | G11B 19/00 360/69 |
| 6,333,830 B2 | 12/2001 | Rose et al. | |
| 6,417,989 B1 * | 7/2002 | Yang | G11B 5/3103 360/121 |
| 6,441,994 B1 | 8/2002 | Wang et al. | |
| 6,466,401 B1 | 10/2002 | Hong et al. | |
| 7,102,854 B2 | 9/2006 | Wang et al. | |
| 7,149,045 B1 * | 12/2006 | Mallary | G11B 5/11 360/55 |
| 8,339,736 B2 | 12/2012 | Gao et al. | |
| 8,514,517 B1 | 8/2013 | Batra et al. | |
| 8,547,659 B1 | 10/2013 | Bai et al. | |
| 8,786,983 B1 | 7/2014 | Liu et al. | |
| 9,082,428 B1 * | 7/2015 | Xue | G11B 5/17 |
| 9,153,254 B1 | 10/2015 | Rivkin et al. | |
| 9,269,377 B2 | 2/2016 | Gubbins et al. | |
| 2003/0090834 A1 * | 5/2003 | Kamarajugadda | G11B 5/17 360/123.31 |
| 2008/0002290 A1 * | 1/2008 | Allen | G11B 5/1278 360/123.02 |

* cited by examiner

*Primary Examiner* — Peter Vincent Agustin
(74) *Attorney, Agent, or Firm* — Hall Estill Attoneys at Law

(57) ABSTRACT

A data writer may be constructed and operated as part of a data storage device. The data writer can be positioned proximal a data storage medium. The data writer may have a write pole positioned adjacent a writer coil with the writer coil having a plurality of turns. A controller that is connected to each turn can be adapted to selectively activate less than all the coil turns in response to the data writer being positioned over a first portion of a data storage medium and selectively activate all of the coil turns in response to the data writer being positioned over a second portion of the data storage medium.

20 Claims, 4 Drawing Sheets

SELECTIVE DATA WRITER COIL

SUMMARY

A data storage device employs a data writer in some embodiments that is positioned proximal a data storage medium. The data writer consists of a write pole positioned adjacent a writer coil with the writer coil having a plurality of turns. Less than all the available turns of the writer coil are selectively activated depending on a number of possible operating conditions, such as the position of the data writer, results of performance tests, results of erasure tests, and performance and erasure standards imposed on a specific data writer.

A controller that is connected to each turn selectively activates less than all the coil turns in response to the data writer being positioned over a first portion of a data storage medium and selectively activates all of the coil turns in response to the data writer being positioned over a second portion of the data storage medium.

DETAILED DESCRIPTION

In data storage devices that utilize a transducing head to write data to, and retrieve data from, a rotating data storage medium, data has progressively become more density arranged to provide increased data storage capacity. However, greater data density causes a data writer to be more precise and responsive. Hence, various embodiments are directed to a data writer that selectively activates write coils of a data writer to adaptively increase the data resolution and data writing speed to meet the dynamic performance specifications needed to optimize data programming.

Figure 1:
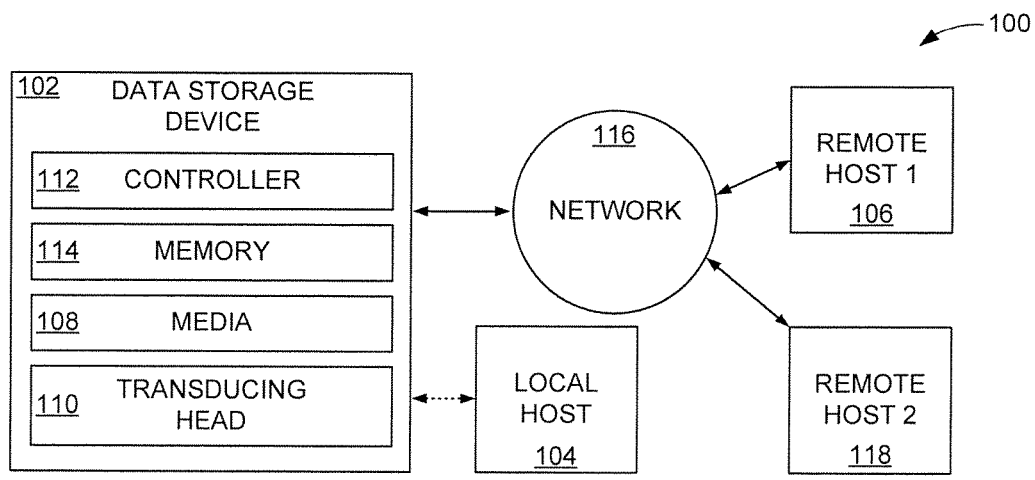
FIG. 1 is a block representation of an example portion of a data storage system configured and operated in accordance with some embodiments.

FIG. 1 is a block representation of an example data storage system 100 where one or more data storage devices 102 provide a data capacity accessible via local 104 and/or remote 106 hosts. A data storage device 102 is not limited to a particular type, size, speed, or capacity, but has at least one rotating magnetic medium 108 accessed by a transducing head 110 as directed by a local controller 112 to write, and read, data stored on the medium 108. The data storage device 102 can employ local memory 114 that is volatile, or non-volatile, to provide temporary (cache) storage or a long-term data repository, such as in a hybrid device that utilizes solid-state non-volatile memory.

While a data storage device 102 can stand alone to store data for a computing device, such as a stationary or mobile computer, tablet, or smartphone, the device 102 may be accessed via a remote host 106 via a wired, or wireless, network 116 to provide cloud computing capabilities to any number of computing devices. For example, the data storage device 102 may be part of a server that employs multiple separate, but interconnected, data storage devices 102 that can be individually and collectively accessed to store and retrieve data by first 106 and second 118 remote hosts, which can be remote nodes, controllers, and memories.

Figure 2:
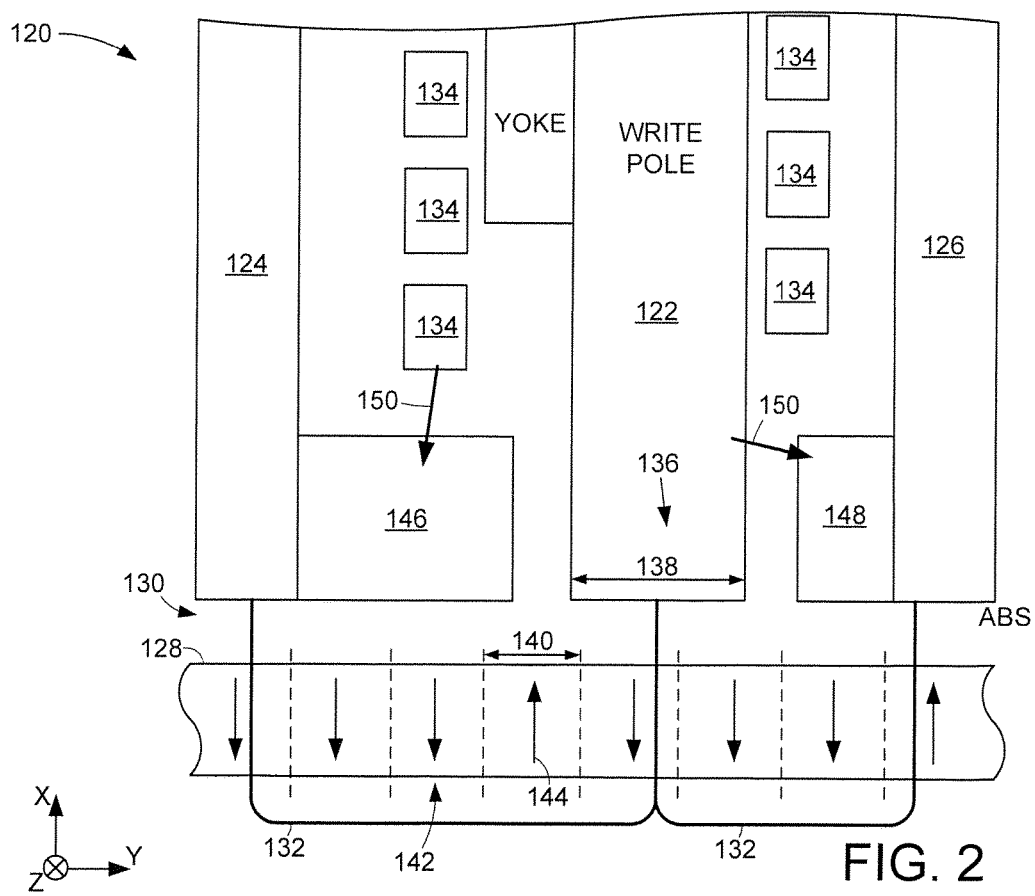
FIG. 2 shows a cross-sectional view block representation of a portion of an example data writer capable of being utilized in the data storage system of FIG. 1.

The transducing head 110 of a data storage device 102 can utilize at least one data writer to write data to the magnetic medium 108. FIG. 2 is a cross-sectional line representation of a portion of an example data writer 120 that can be employed in the data storage device 102 of FIG. 1. The data writer 120 has a main write pole 122 that is disposed between leading 124 and trailing 126 return poles, as dictated by the direction of travel of the adjacent data storage medium 128. The write pole 122 rides on an air bearing 130 and writes data by establishing a magnetic pathway 132 through the data storage medium 128 to first 124 and/or second 126 return poles. To establish the magnetic pathway 132, magnetic flux is directed from a write coil 134 to the write pole 122 directly and/or via a yoke that is recessed from the air bearing surface (ABS).

The main write pole 122 can be configured with a write pole tip 136, which can have a width 138 that matches the width 140 of a data track 142 to optimize programming data bits 144 stored in the data tracks 142. As the areal density of the data bits 144 increases to provide greater data capacity, the data track width 140 reduces, which emphasizes the accuracy magnetic flux delivery from the write pole 122 as well as shielding from leading 146 and trailing 148 shields on the ABS.

However, nanometer scale physical dimensions for the various data writer 120 components can degrade magnetic flux delivery to the data storage medium 128. For instance, bringing one or both shields 146 and 148 in closer proximity to the write pole tip 136 can reduce the magnetic extent of the write pole 122, but can be prone to unwanted magnetic shunting that decreases writer performance, as illustrated by arrows 150. The position and size of the respective shields 146/148 can also create inadvertent shunting from the write coil 134 that degrades the data writing speed and accuracy of the write pole 122.

One issue associated with data writer design is the interplay between writer dynamics and erasure that can occur when magnetic fields from the write pole 122, shields 146/148, and/or return poles 124/126 emanate beyond the data track width 140 of a selected data track 144. Erasure fields are mostly generated by shields that are in direct proximity to the write pole 122, such as the leading shield 146, trailing shield 148, and side shields (not shown) aligned with the write pole 122 along the Z axis. Erasure events result from a brief transient state that is established when the write pole tip 136 undergoes a magnetization reversal while dynamic properties tend to be quite consistent.

The amplitude of an erasure event, which can be quantified by bit error rate (BER) degradation, tends to be an inverse function of the write pole 122 current risetime. At the same time, write pole 122 field risetime has a more complicated dependence on the current profile of the write pole 122, which generally improves linearly with the current risetime with mostly an inverse dependence on the current (overshoot) amplitude. As such, selection of an optimal data writing current often resorts to longer current risetimes combined with large overshoot. However, at some point, a rather large increase in current results in minor risetime improvement at the expense of worsening the erasure event. Meanwhile, to maintain data writing performance at high datarates associated with high data density storage environments, the magnetic risetime is required to be some fraction of the shortest data bit 144, which creates an issue of balancing magnetic risetime with erasure In some embodiments, risetime is balanced with erasure by using a faster design where magnetic risetime improvement with current occurs quicker. One such faster design positions the write coil 134 closer to the write pole 122, closer to the flare region of the write pole 122 by bringing the coil 134 closer to the ABS, and/or reducing the dimensions of the coil 134 to make the coil material more dense. In yet, such faster designs can also worsen erasure events for identical magnetomotive force (MMF), or equivalent total current integrated over the number of coil turns, while not being capable of adapting to changing datarates encountered in different portions of a rotating data storage medium. Essentially, a writer design that requires less MMF and produces less erasure for large current amplitudes and fast write field risetimes produces more erasure for lower current amplitudes and lower write field writetimes.

Accordingly, some embodiments configure the write coil 134 as a single piece of material with multiple independent connections to a controller that allows for individual activation of coil turns. That is, the write coil 134 has a number of coil turns that are separately connected to, and activated by, a controller to control the dynamic risetimes and overshoot as well as the risk and amplitude of erasure events. Alternatively, the selected activation of the coil turns can be preprogrammed by methods other than the controller configuration, such as selective shunting or severing of contacts prior to the write head being mounted in the data writer. In this case, while the selection cannot be performed during the operation of the writer, one can have a single original design that is then adjusted to conform to a particular required combination of erasure and performance.

One can foresee particular applications when one writer design is conducive to a data storage device having very different specifications that are subsequently selected as a result of one or more performance tests on the data storage device, either during manufacturing or after user data has been written to the device, to adjust data storage performance relative to erasure balance. In all cases, the ability to control the coil current delivery and erasure events allows the data writer 120 to adapt to different datarates on a data storage medium to balance risetime with overshoot to provide optimized data writing performance throughout the medium. When the selective activation occurs, this adjustment can be done within a wide range of datarates, while continuously operating on the same data storage medium.

Figure 3:
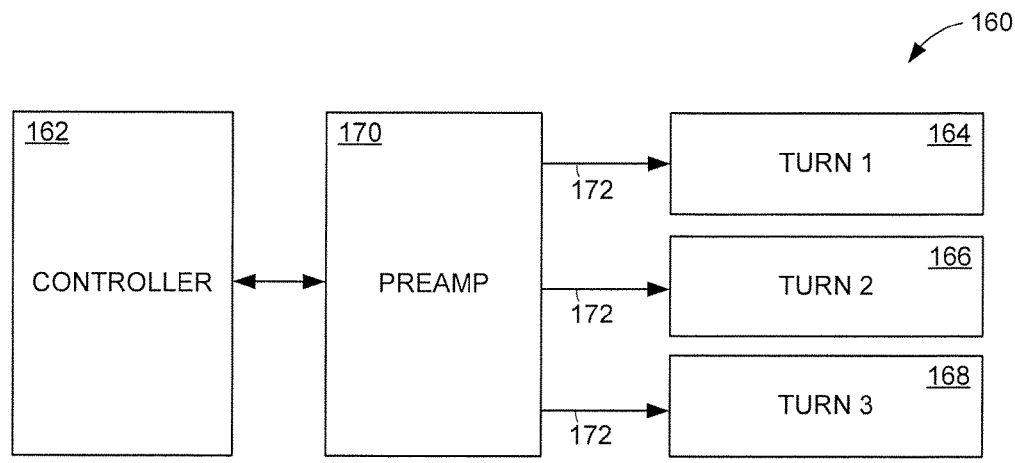
FIG. 3 displays a block representation of a portion of an example data storage device that is utilized in the data storage system of FIG. 1.

FIG. 3 is a block representation of a portion of an example data storage device 160 that can employ a data writer in accordance with various embodiments. The data storage device 160 can have one or more local, or remote, controllers 162 that can individually activate first 164, second 166, and third 168 coil turns via a preamp 170. As shown, each coil turn 164/166/168 is connected to the preamp 170 via separate control lines 172, which allow for current to flow and activate one turn without activating all the coil turns 164/166/168.

It is noted that the turns 164/166/168 are expected to be different portions of a common write coil, such as coil 134 of FIG. 2. That is, a write coil in some embodiments is a single piece of material in which coil turns 164/166/169 are arranged. The term coil turn is meant as less than all of a conductive pathway that makes up a data writer coil. As a non-limiting example, a writer coil can comprise a plurality of turns positioned proximal different vertical regions of a write pole. For clarity, a coil turn is a part of a writer coil that is positioned proximal a write coil.

Figure 4:
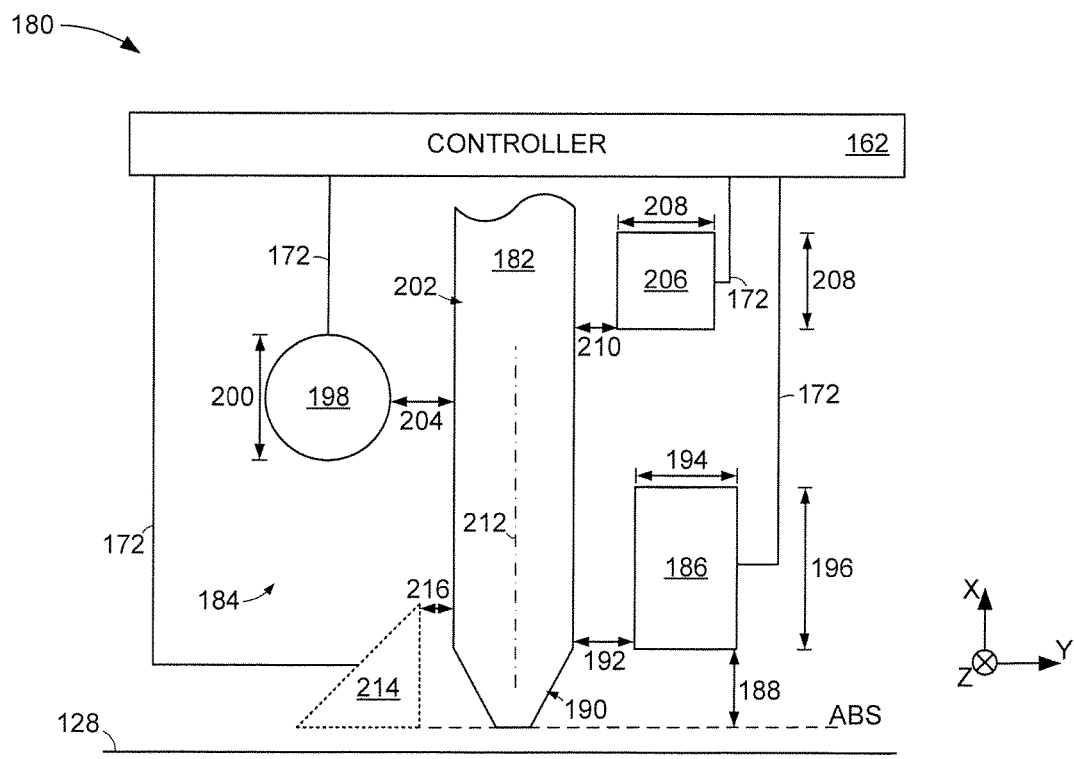
FIG. 4 illustrates a cross-sectional line representation of a portion of an example data writer that can be employed in the data storage system of FIG. 1.

In various embodiments, a write coil continuously extends to position a coil turn on opposite sides of the write coil while other embodiments arrange a write coil to comprise a single coil positioned proximal a write pole. FIG. 4 illustrates a cross-sectional line representation of a portion of an example data writer 180 where a write pole 182 is disposed between multiple coil turns of a write coil 184. A first coil turn 186 is separated from an ABS by a first distance 188 along the X axis and from a write pole tip 190 by a second distance 192 along the Y axis. Although a coil turn can be any size, position, and shape, the first turn 186 has a rectangular shape with cross-sectional boundary width 194 and height 196 dimensions.

The first coil turn 186 can continuously extend to the second coil turn 198, which has a circular cross-sectional shape and a diameter 200 and is separated from a body portion 202 of the write pole 182 by a third distance 204. It is noted that the second coil turn 198 is on an opposite side of the write pole 182 from the first 186 and third 206 coil turns. The third coil turn 206 has a square shape with uniform width and height dimensions 208 that is separated from the write pole body 202 by a fourth distance 210. While not explicitly stated, each coil turn 186/198/206 is separated from the ABS by different distances, as measured along the X axis that is parallel to a longitudinal axis 212 of the write pole 182.

However, some embodiments position a coil turn on the ABS, as shown by the triangular shaped fourth turn 214 that is separated from the write pole tip 188 by a fifth distance 216. The fourth turn 214 may be incorporated with the first 186, second 198, and third 206 turns or may stand alone as a single coil turn, as indicated by the segmented boundary. The ability to activate individual turns allows different regions of the write pole 182 to be magnetized and the location of generated magnetic fields to be controlled. For instance, the third coil turn 206 can be individually activated while the first 186 and second 198 turns are deactivated to localize magnetic fields to the pole body 202, away from the ABS and magnetic shields, such as leading, trailing, and side shields.

Magnetic field generation may further be controlled by tuning the separation distances 192/204/210/216 of the respective coils 186/198/206/214 from the write pole 182. It is contemplated that the separation distances are all the same, but some embodiments position at least one coil turn closer to the write coil 182 than the other turns. The customization of the number, size, shape, position, and activation of the various coil turns 186/198/206/214 provides a balance between risk of magnetic shunting that promotes erasure conditions and write pole magnetic risetime that corresponds to how fast the data writer 180 can write data and how densely data bits can be packaged on a data storage medium.

It is noted that a write coil can employ multiple coil turns with the same cross-sectional shape. However, the ability to utilize multiple different coil turn shapes and sizes allows for more diverse control of the delivery of magnetization from the coil 184 to the write pole 182. Besides erasure and performance balancing, selected activation of a turn only on a side of a writer, such as coil 186 of FIG. 4, will allow for dynamic adjustment of writer field angle, which is predominantly determined by the balance of MMF on opposite sides of the writer. This allows more aggressive tuning of device performance and better matching of device operating parameters with a particular magnetic media design.

Figure 5:
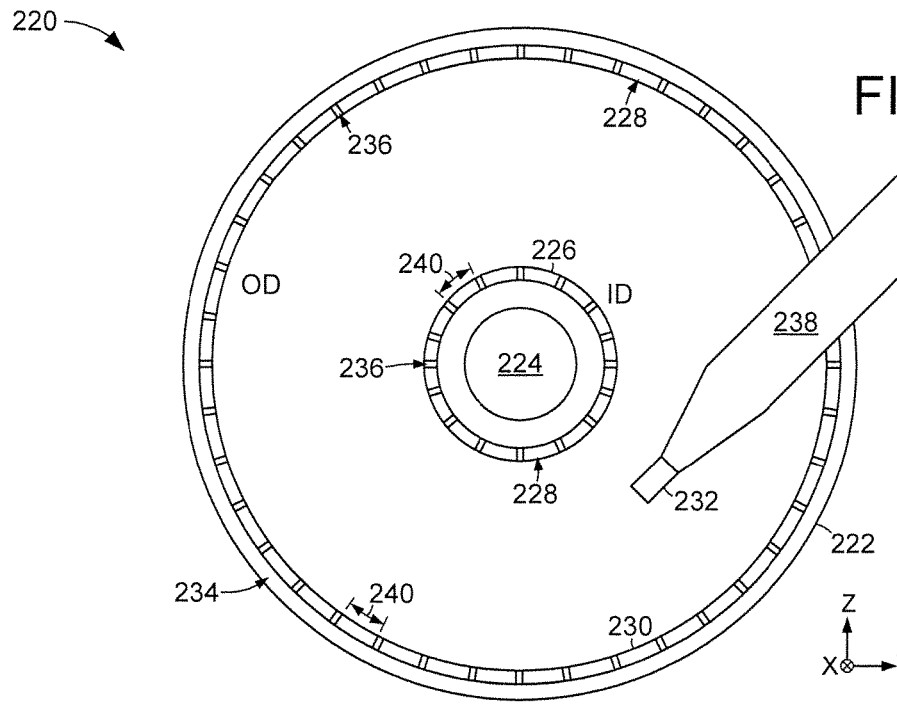
FIG. 5 is a top view line representation of a portion of an example data storage device configured in accordance with various embodiments.

FIG. 5 displays a top view line representation of a portion of an example data storage device 220 as constructed and operated in accordance with various embodiments to adapt write coil activation to provide optimized data writing throughout a data storage medium 222. As shown, the data storage medium 222 spins about a central spindle 224 and has a inner diameter (ID) region proximal the spindle 224 and an outer diameter (OD) region distal the spindle 224.

The decreased circumference of an ID data track 226 allows less data bits 228 to occupy the track 226 compared to the OD data track 230 that has a much greater circumference and number of data bits 228, which corresponds with a data writer 232 encountering different datarates for the respective ID 226 and OD 230 data tracks when the medium 222 spins at a constant speed. Although the rotational velocity of the data storage medium 222 can be adjusted depending on the location of the data writer 232 to provide consistent datarates throughout the writing surface 234 of the data storage medium 222, the ability to selectively activate individual writer coil turns allows the data writer 232 to adapt writer dynamics to accommodate different datarates.

As a non-limiting example, the data writer 232 can be directed, by a controller and/or non-user servo data 236, to activate two or more coil turns that confidently programs data at the low datarate of the ID data track 226 and to activate a single coil turn to allow the data writer 232 to program data at the high datarate of the OD data track 230. That is, the various coil turns of the data writer 232 can be positioned conservatively and aggressively so that the conservative coil turn(s) can be activated to obtain sufficient magnetic risetime with modest risk of erasure to accommodate low datarates while aggressive coil turn(s) can be activated to accommodate high datarates, albeit with a higher risk of erasure conditions occurring. The ability to adapt to different datarates by activating and deactivating coil turns allows the data writer 232 to change very quickly and on-the-fly while other data access operations are conducted, such as data reading, writer actuation via the actuation assembly 238, or data writing.

Hence, a data writer 232 with individually selectable coil turns allows different coil turns to be activated, or deactivated, to reliably write data at the datarate of the data track where the data writer 232 resides while minimizing the risk and severity of erasure conditions that often occur when excessive write current flows through a write coil. By configuring the various coil turns from a single piece of material, as opposed to multiple separate write coils, activation of coil turns is simpler and more efficient as write current quickly flows through, and dissipates from, a single piece of material compared to separate coils.

Figure 6:
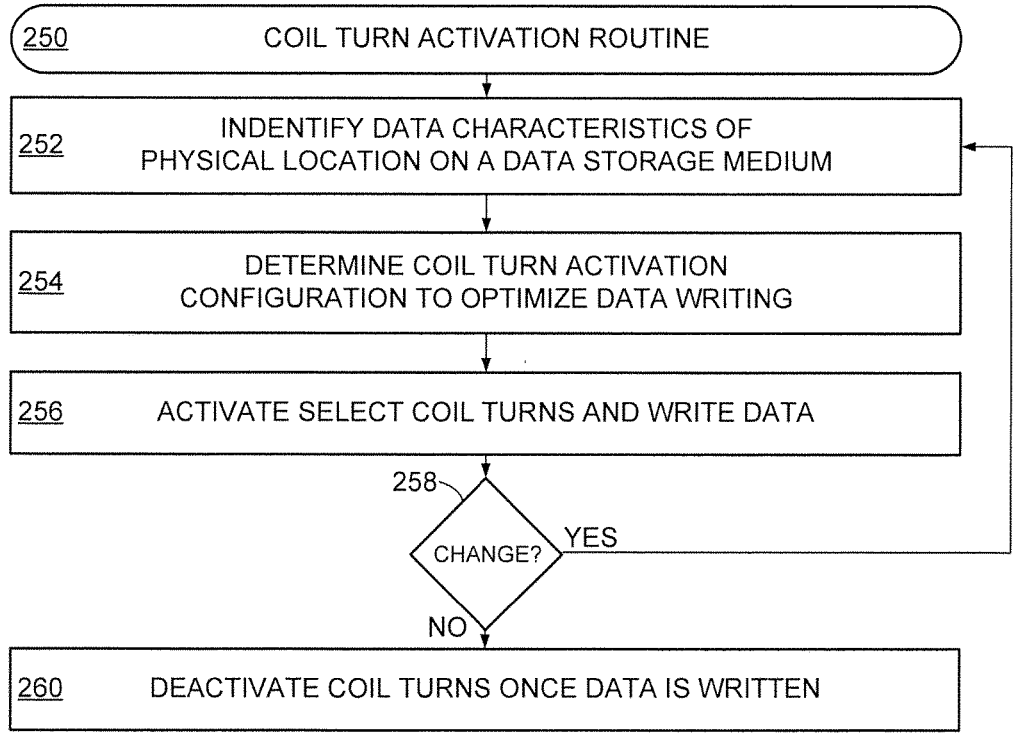
FIG. 6 conveys a flowchart of an example coil turn activation routine that can be executed by the data storage system of FIG. 1.

As such, a write coil can have X coil turns that are selectively activated to match the datarate and/or bit length 238 of a data track regardless of where the data writer 232 is positioned on the data storage medium 222. FIG. 6 conveys an example coil turn activation routine 250 that can be carried out by an example data storage device in accordance with assorted embodiments. The routine 250 begins with a data writer being positioned adjacent a data storage medium and configured with a single write coil that has a plurality of individually selectable coil turns. Step 252 identifies the data characteristics of a physical location, such as a data track, on the data storage medium, which may be the datarate, bit length, timing, repeated runout, error correction code, and gray code stored in servo regions of a data track or known by a controller.

The data characteristics of a chosen write location allows step 254 to determine the coil activation configuration that optimizes write performance. While not limiting, optimized write performance can be a balance of write pole risetime, current overshoot, erasure risk, and erasure severity to provide data writing speed and accuracy with minimal risk of writing error. For instance, a low datarate may correspond with coil turn(s) that are relatively far away from the write pole and ABS being activated while a high datarate may correspond with a single coil turn that is relatively close to the ABS and write pole being activated. In some embodiments, the single coil turn has a larger cross-sectional area and different shape than other turn(s) of the write coil.

The coil activation configuration is then executed in step 256 with one or more coil turns being activated and data being written to the chosen location of the data storage medium. While the selected coil turns can be activated for any amount of time, decision 258 evaluates if the coil activation needs to be changed, such as movement of the data writer to another location on the data storage medium. If a change has occurred, or is imminent, decision 258 returns routine 250 to step 252. In the event no change is experienced, step 260 deactivates the write coil at the conclusion of data writing.

Figure 7:
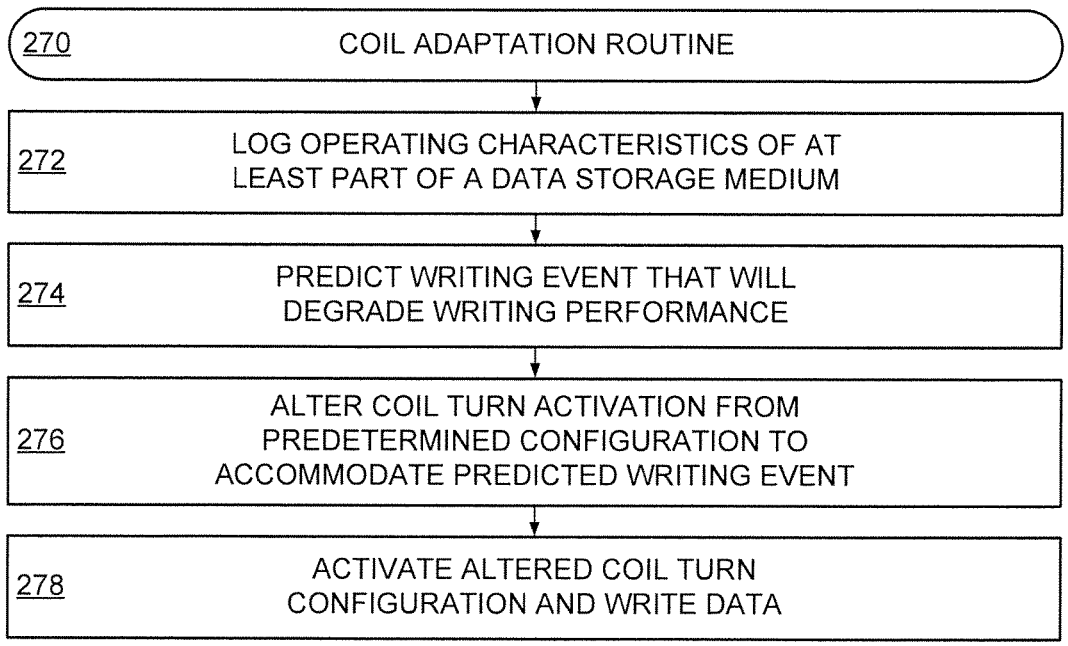
FIG. 7 provides a flowchart of an example coil adaptation routine carried out by the data storage system of FIG. 1.

Having individually selectable coil turns not only allows a controller to be reactive to identified data characteristics, but also allows for proactive coil adaptation. FIG. 7 is a flowchart of an example coil adaptation routine 270 that can proactively adapt a write coil to mitigate predicted events that can degrade write performance. Initially, step 272 logs operational characteristics of a data storage medium. The logged operational characteristics are not limited and can evaluate bit error rate, repeated runout, data writing frequency, and length of a pending data sector to predict a writing event that can degrade writing performance, such as induce writing errors and cause erasure conditions.

The prediction of a degrading writing event can be conducted by a local, or remote, controller and can involve data filtering, such as using a bloom filter, and may consult one or more data tables or databases to determine a likelihood percentage of a writing event happening. The ability to utilize actual logged operational data along with predetermined data and events allows step 274 to quickly and accurately predict the occurrence of a data writing error, which can improve data storage device performance.

With one or more writing events predicted in step 274, step 276 proceeds to alter a predetermined coil turn activation configuration to accommodate the predicted event(s). For example, a predetermined activation configuration may call for multiple coil turns to be active to match a datarate of a physical data address on a data storage medium and step 278 alters the configuration to add a third active coil turn in an attempt to prevent a predicted writing error to that physical data address. The alteration of an activation configuration is not limited to adding a coil turn as a conservative coil turn activation configuration with turns spaced distal to the write pole and ABS can be altered to a single coil turn that is positioned proximal the ABS and write pole. The altered coil turn activation configuration is executed in step 278 to write data onto the data storage medium.

Figure 8:
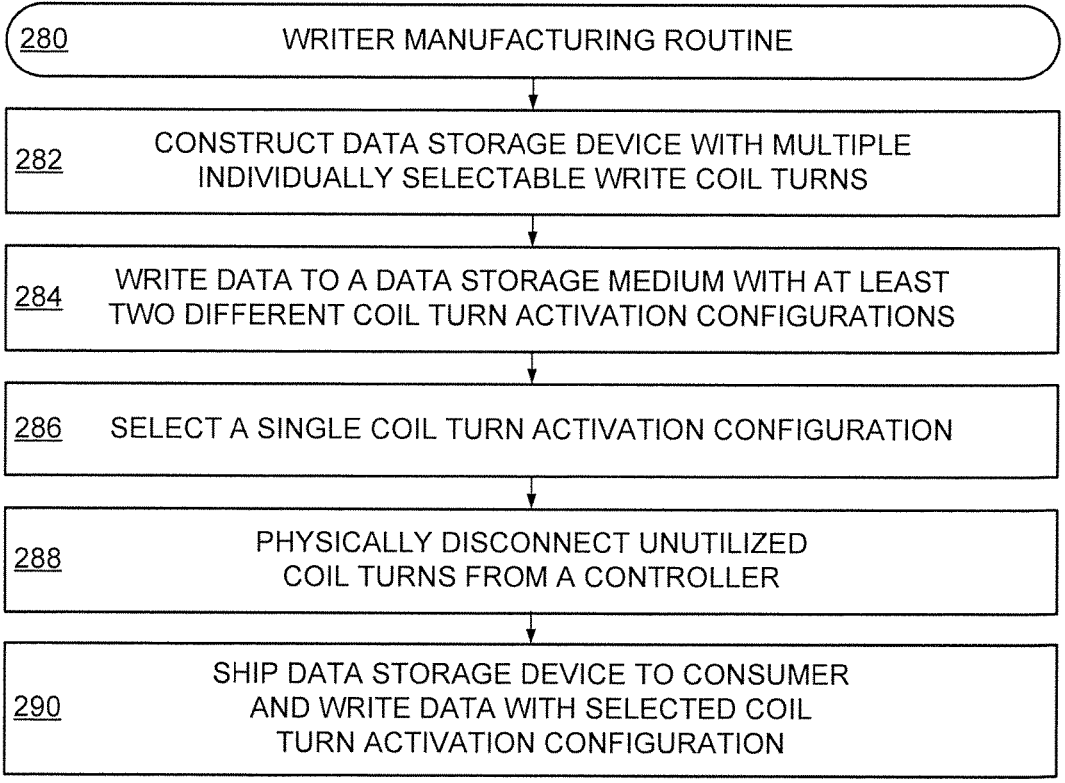
FIG. 8 is a flowchart of an example writer manufacturing routine that may be utilized in accordance with some embodiments.

While the ability to on-the-fly predict and adapt coil turn activation allows a data storage device to activate different coil turns for different physical data addresses on a data storage medium, such ability is not always needed. In some embodiments, a single coil turn activation configuration is selected during manufacturing of a data storage device to simplify coil activation and data writing. FIG. 8 displays an example writer manufacturing routine 280 that can be carried out prior to user data being stored on a data storage device. Routine 280 starts by constructing a data storage device in step 282 with a writer coil extending around a write pole with multiple individually selectable write coil turns. Step 282 can further arrange the various aspects of the data storage device, such as voice coil motor, spindle, actuator, and data storage media, to allow data to be written to at least one data storage medium.

Step 284 then writes at least one test pattern to one or more data storage media with at least two different coil turn activation configurations in order to find the activation configuration compatible with the data storage environment. It is noted that the analysis of step 284 can consider data density, media spinning speed, and expected writing speed of the data storage device when evaluating the written test pattern(s) to select a single coil turn activation configuration in step 286. The selection in step 286 can be based on any number of criteria, such as lowest BER, lowest risk of erasure, lowest erasure severity, fastest risetime, or a balance of erasure and risetime. In the case of a balance, it is noted that the selected coil turn activation configuration may not be the fastest risetime or the lowest risk of erasure, but instead is a configuration where data writing performance as a whole is promoted despite having slower than ideal pole risetime and higher than ideal risk of erasure.

As a result of the selected coil turn activation configuration, less than all the available coil turns may be activated. However, it is contemplated that all available coil turns are activated in the configuration selected in step 286. In the event less than all tested coil turns are part of the selected coil turn activation configuration, step 288 physically disconnects the non-selected, unutilized coil turns from a controller. Such physical disconnection can cut the control line (172 of FIGS. 3-4) of the non-selected coil turn, which leaves the coil turn as a physical extension of the write coil, or the physical disconnection can cut the coil turn itself from the write coil. In some embodiments, a cut coil turn can be removed from the data writer while other embodiments leave a cut coil turn in the data writer, which simplifies manufacturing without degrading writer performance.

The physical disconnection of a coil turn completes manufacturing of a data writer and allows step 290 to then ship the completed data storage device to a consumer where user data is written with the coil turn activation configuration selected in step 286 and arranged in step 288. The data storage device may be further tested between steps 288 and 290, but without the individual activation of the physically disconnected coil turn. That is, a coil turn may be present in a data writer without having any write current flow in the case of a physically cut coil turn or may be present with write current flow in the case of a physically cut coil turn control line where the coil turn remains in the write coil as an extension of the selected coil turns. Hence, step 290 can ship a data writer with an unselected coil turn that is dead or alive as a passive portion of a write coil.

It is noted that the various aspects of routines 250, 270, and 280 are merely exemplary and are in no way limiting or required. Thus, any step and decision of the assorted routines can be changed, moved, or removed and any step or decision can be added without deterring from the spirit and practical result of the respective routines 250/270/280. For example, an additional step may be incorporated into routine 270 where at least one test pattern is written with a predicted coil turn activation configuration to ensure the predicted writer dynamics are accomplished prior to writing user data.

Through the assorted embodiments of the present disclosure, a write coil has at least one individually selectable coil turn that allows different write coil activation configurations to write data to different portions of a data storage medium. The ability to activate varying numbers of coil turn(s) to write data can optimize data writing performance while adapting to varying datarates and/or data lengths present on a data storage medium. The optimized balance of write pole magnetic risetime with risk of erasure conditions can ensure reliable data writing even in high data density data storage environments.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a write pole of a data writer positioned adjacent a writer coil having multiple turns each connected to a controller, the controller adapted to selectively activate less than all the multiple turns in response to the data writer being positioned over a first portion of a data storage medium and selectively activate all of the multiple turns in response to the data writer being positioned over a second portion of the data storage medium.

2. The apparatus of claim 1, wherein the each turn of the multiple turns is a portion of a continuous electrically conductive piece of material.

3. The apparatus of claim 1, wherein a preamp is positioned between the controller and the respective turns of the multiple turns.

4. The apparatus of claim 1, wherein the write pole forms a magnetic loop with at least one return pole through the data storage medium, the writer coil positioned distal to the return pole.

5. The apparatus of claim 1, wherein the first portion of the data storage medium is proximal an inner diameter and distal an outer diameter, the second portion of the data storage medium being proximal the outer diameter and distal the inner diameter.

6. The apparatus of claim 1, wherein the first portion of the data storage medium has a lower datarate than the second portion of the data storage medium.

7. An apparatus comprising:
a data storage medium;
a data writer positioned proximal the data storage medium, the data writer comprising a write pole positioned adjacent a writer coil, the writer coil having a first turn positioned proximal an air bearing surface and a second turn positioned distal the air bearing surface; and
a controller connected to the first turn via a first control line and to the second turn via a second control line, the controller adapted to selectively activate only the first turn in response to the data writer being positioned over a first portion of a data storage medium and selectively activate the first and second turns in response to the data writer being positioned over a second portion of the data storage medium.

8. The apparatus of claim 7, wherein the first turn has a larger surface area than the second turn.

9. The apparatus of claim 7, wherein the first turn has a different cross-sectional shape than the second turn.

10. The apparatus of claim 7, wherein the write pole is disposed between the first and second turns.

11. The apparatus of claim 7, wherein a third turn of the writer coil positioned proximal the write pole and physically disconnected from the first and second turns.

12. The apparatus of claim 7, wherein the first turn is closer to the write pole than the second turn.

13. A method comprising:
  positioning a data writer proximal a data storage medium, the data writer comprising multiple turns positioned proximal a write pole;
  activating less than all the multiple turns with a controller in response to the data writer being positioned over a first portion of the data storage medium; and
  activating all the multiple turns with the controller in response to the data writer being positioned over a second portion of the data storage medium.

14. The method of claim 13, wherein the controller activates one or more of the multiple turns in response to a predicted bit error rate.

15. The method of claim 13, wherein the controller activates one or more of the multiple turns in response to a detected bit error rate.

16. The method of claim 13, wherein a first turn of the multiple turns is active during data writing throughout the data storage medium, the first turn positioned distal an air bearing surface.

17. The method of claim 16, wherein a second turn of the multiple turns is activated by the controller to decrease magnetic risetime of the write pole, the second turn positioned proximal the air bearing surface.

18. The method of claim 16, wherein at least one turn of the multiple turns is positioned proximal the writer pole, the at least one turn being physically disconnected and rendered inoperable after at least one testing routine.

19. The method of claim 13, wherein two turns of the multiple turns are activated and one turn of the multiple turns is kept inactive by the controller when the data writer is over the first portion.

20. The method of claim 13, wherein the writer coil comprises only first and second turns, the controller activating the first turn while maintaining the second turn in an inactive state when the data writer is over the first portion.

* * * * *